US009524083B2

(12) United States Patent
Lewis et al.

(10) Patent No.: US 9,524,083 B2
(45) Date of Patent: Dec. 20, 2016

(54) CUSTOMIZING MOBILE MEDIA END CAP USER INTERFACES BASED ON MOBILE DEVICE ORIENTATION

(71) Applicant: Google Inc., Mountain View, CA (US)

(72) Inventors: Justin Lewis, Marina del Rey, CA (US); Ruxandra Georgiana Paun, Santa Monica, CA (US)

(73) Assignee: GOOGLE INC., Mountain View, CA (US)

( * ) Notice: Subject to any disclaimer, the term of this patent is extended or adjusted under 35 U.S.C. 154(b) by 216 days.

(21) Appl. No.: 14/042,387

(22) Filed: Sep. 30, 2013

(65) Prior Publication Data

US 2015/0095775 A1   Apr. 2, 2015

(51) Int. Cl.
  G06F 3/0484   (2013.01)
  H04N 21/41   (2011.01)
  H04N 21/414   (2011.01)
  H04N 21/422   (2011.01)
  H04N 21/431   (2011.01)
  H04N 21/442   (2011.01)

(52) U.S. Cl.
  CPC ........ G06F 3/0484 (2013.01); H04N 21/4126 (2013.01); H04N 21/41407 (2013.01); H04N 21/42202 (2013.01); H04N 21/4316 (2013.01); H04N 21/44218 (2013.01)

(58) Field of Classification Search
  CPC ... G06F 1/1626; G06F 3/0484; H04N 21/4126
  See application file for complete search history.

(56) References Cited

U.S. PATENT DOCUMENTS

| 2007/0288836 | A1* | 12/2007 | Partovi ...................... 715/500.1 |
| 2008/0055272 | A1 | 3/2008 | Anzures et al. |
| 2008/0294694 | A1* | 11/2008 | Maghfourian .... G06F 17/30855 |
| 2009/0024923 | A1* | 1/2009 | Hartwig et al. .............. 715/716 |
| 2011/0289094 | A1* | 11/2011 | Fisher ................. G06F 17/3002 707/748 |
| 2012/0174157 | A1 | 7/2012 | Stinson, III et al. |

OTHER PUBLICATIONS

"How to Make Your Website Respond to Different Mobile Devices", Josh Byers, Dec. 5, 2011.*
"YouTube Rolls Out New 'End of Video' Suggestions", Oct. 12, 2011.*
"Autoplay on related videos", YouTube Help Forum, May 4, 2011.*
International Searching Authority, "Notification of Transmittal of the International Search Report and the Written Opinion of the International Search Authority, or the Declaration," for International Application No. PCT/US2014/058407, mailed Dec. 31, 2014, 6 pages.

* cited by examiner

Primary Examiner — Li Sun
(74) Attorney, Agent, or Firm — Lowenstein Sandler LLP

(57) ABSTRACT

A mobile device determines playback of a media item is complete on the mobile device and determines that an orientation of the mobile device is in landscape mode in response to the playback being complete. The mobile device provides a user interface that corresponds to the landscape mode and presents additional content pertaining to the media item in the landscape mode.

17 Claims, 5 Drawing Sheets

CUSTOMIZING MOBILE MEDIA END CAP USER INTERFACES BASED ON MOBILE DEVICE ORIENTATION

TECHNICAL FIELD

The present disclosure relates to media end cap user interfaces and, more particularly, to a technique of customizing mobile media end cap user interfaces based on mobile device orientation.

BACKGROUND

Users may use computing devices (such as smart phones, cellular phones, laptop computers, desktop computers, netbooks, tablet computers, gaming consoles, television consoles) to use, play, and/or consume media items (e.g., watch digital videos, and/or listen to digital music). Such media items may include audio clips, movie clips, TV clips, and music videos, as well as amateur content, such as video blogging, short original videos, pictures, photos, other multimedia content, etc. Traditionally, when a video finishes playing on a mobile device, the mobile device presents additional content (e.g., videos) to a user in a portrait orientation in the display of the mobile device, even if the user is holding the mobile device in a horizontal position. A user generally should switch the position of the mobile device to a vertical orientation to view the additional content presented. Conventional solutions that rely on a user changing the orientation of the mobile device may distract the user from continuing to watch videos, which may result in a user ending a session. When the mobile device presents content in the vertical position on the mobile device, the content is generally limited to video playback using a small portion of the mobile device display. The remaining portion of the mobile device typically displays content information relating to the video and commonly requires a user to scroll down in the user interface in order to select another video to watch, which may also result in the user becoming less engaged with the media items and the user ending the session.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

A method and apparatus to provide custom mobile end cap user interfaces based on mobile device orientation is described. The method includes determining playback of a media item is complete on a mobile device and determining that an orientation of the mobile device is in landscape mode in response to the playback being complete. The method includes providing a user interface that corresponds to the landscape mode and presents additional content pertaining to the media item in the landscape mode.

In one implementation, providing the user interface includes determining whether the media item is part of a group of media items and causing the user interface to be populated with one of the group of media items if the media item is part of the group of media items. In one implementation, the media item is an episodic media item and the one of the group of media items is a next episode media item in the group of media items. In one of the implementation, the media item is part of a playlist and the one of the group of media items is a media item in the playlist. In one implementation, the additional content pertaining to the media item includes one or more of a set of media items that are related to the media item in the user interface in the landscape mode on the mobile device. In one implementation, the method further includes changing the additional content of the user interface by causing the user interface to be populated with one of the set of media items that are related to the media item. The set of media items is a playlist and/or a series of episodic media items. In one implementation, the method further includes providing one or more elements in the user interface to receive user input pertaining to an action relating to the media item.

An apparatus to provide custom mobile end cap user interfaces based on mobile device orientation is also described. The apparatus includes means for determining playback of a media item is complete on a mobile device and means for determining that an orientation of the mobile device is in landscape mode in response to the playback being complete. The apparatus also includes means for providing a user interface that corresponds to the landscape mode and presents additional content pertaining to the media item in the landscape mode.

In one implementation, the means for providing the user interface includes means for determining whether the media item is part of a group of media items and means for causing the user interface to be populated with one of the group of media items if the media item is part of the group of media items. In one implementation, the media item is an episodic media item and the one of the group of media items is a next episode media item in the group of media items. In one of the implementation, the media item is part of a playlist and the one of the group of media items is a media item in the playlist. In one implementation, the additional content pertaining to the media item includes one or more of a set of media items that are related to the media item in the user interface in the landscape mode on the mobile device. In one implementation, the apparatus further includes means for changing the additional content of the user interface by causing the user interface to be populated with one of the set of media items that are related to the media item. The group of media items is a playlist and/or a series of episodic media items. In one implementation, the apparatus further includes means for providing one or more elements in the user interface to receive user input pertaining to an action relating to the media item.

In additional implementations, computing devices for performing the operations of the above described implementations are also implemented. Additionally, in implementations of the disclosure, a computer readable storage media may store instructions for performing the operations of the implementations described herein.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
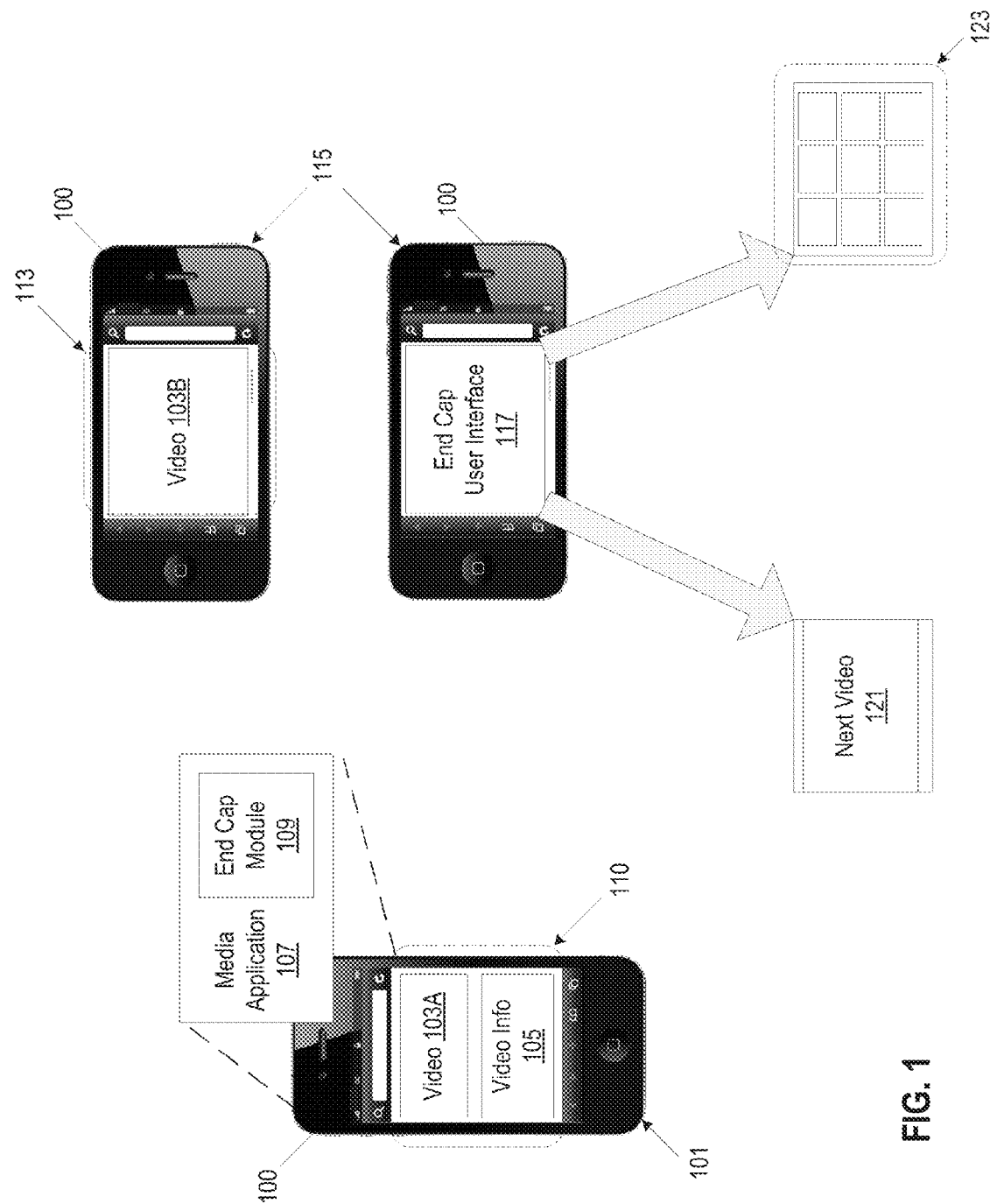
FIG. 1 is a diagram illustrating an example user interface of an end cap user interface on a mobile device in accordance with one or more implementations.

A system and method for providing custom mobile end cap user interfaces based on mobile device orientation is described, according to various implementations. An end cap document hereinafter refers to a document (e.g., webpage, mobile application document) that is rendered to provide an end cap user interface (UI) that is presented to a user following the end of playing a media item (e.g., video). When a video has finished playing, the video can be replaced with an end cap UI. The end cap UI can present a user with content that is related to the video that has completed playback. For example, when Video-XYZ has finished playing, the Video-XYZ is replaced with an end cap UI that presents other videos that are related to Video-XYZ provided in the user interface. Examples of a media item can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A media item can be a media item consumed via the Internet and/or via an application. As used herein, "media," "media item," "online media item," "digital media," and "digital media item" can include an electronic file that can be executed or loaded using software, firmware or hardware configured to present the digital media item to an entity. For brevity and simplicity, an online video (also hereinafter referred to as a video) is used as an example of a media item throughout this document.

Implementations of the present disclosure customize the content of the end cap UI based on the video that has completed playback and the orientation of the mobile device that has completed playback of the video. For example, if the video that has finished playing is part of a group of videos, the end cap UI can contain the next video from the group that is to be played next. For example, if the video is part of episodic videos (e.g., series of video episodes), the end cap UI can include the next video episode that is to be played. For example, if the video that has completed playing is Episode-6, the end cap UI can include Episode-7. In another example, if the video is part of a playlist of videos, the end cap UI can include another video in the playlist. For example, the end cap UI may include the next video in the playlist, a random video from the playlist, etc. In another example, the end cap UI can include a set of videos that are related to the video that has finished playing. In another example, the end cap UI can include user interface elements to receive user input to perform an action (e.g., like, share, rate, comment, etc.) pertaining to the video that has finished playback.

Implementations can provide an end cap UI in a landscape orientation on the mobile device when a video has completed playing. For example, when a video has completed playback and if the mobile device is in a landscape orientation, the end cap UI will be in the landscape orientation on the mobile device. Accordingly, contrary to conventional solutions, which when the video has completed playback, the user interface in the mobile device automatically transitions to vertical mode, implementations allow users to continue viewing an end cap UI, for example, that contains a related video, in the landscape mode without the user having to change the orientations of the mobile device. Implementations can create a combination of various end cap UIs based on the video that has completed playback and the orientation of the mobile device.

FIG. 1 is a diagram illustrating an example end cap user interface (UI) 117 on a mobile device in accordance with one implementation of the present disclosure. A mobile device 100 can be in a portrait orientation 101 or in a landscape mode 115. The mobile device 100 can include a media application 107 to play videos 103A,B. The media application 107 can be for example, a mobile application, a web application, etc. For example, the media application 107 may be a media player embedded in a webpage that is accessible via a web browser. In another example, the media application is a mobile device application for playing media items (e.g., videos). The media application 107 can include an end cap module 109 to provide custom end cap user interfaces 117 based on the video 103A,B that is being played and the orientation 101,115 of the mobile device 100.

The media application 107 can render documents (e.g., webpage, mobile application documents) to provide a user interface for playing an online media item (e.g., video 103A,B). For example, when the mobile device 100 is in portrait orientation 101, a portion (e.g., top portion) of the user interface 110 can be used to play video 103A in portrait orientation 101 and another portion (e.g., bottom portion) of the user interface 110 can be used to provide video information 105 in the portrait orientation 101. Examples of video information 105 can include, and are not limited to, a title of the video, a number of views of the video, the time elapsed since the video was uploaded, the time the video was uploaded, the number of likes of the video, the number of recommendations made for the video, the length of the video, a rating of the video, a description of the video, comments, related videos, user input UI elements, etc.

In another example, when the mobile device 100 is in landscape orientation 115, the user interface 113 can play the video 103B in landscape orientation 115. In one implementation, the entire user interface 113 or a large percentage (e.g., 95%) of the user interface 113 can be used to play the video 103B in landscape orientation 115.

The end cap module 109 can determine whether the video 103B has ended playback in landscape orientation 115, and if the video 103B has ended playback in landscape orientation 115, the end cap module 109 can provide an end cap UI 117 in landscape orientation 115 on the mobile device 100. The video 103B can be replaced with the end cap UI 117. The end cap UI 117 can present a user with content that is related to the video that has completed playback. For example, the end cap UI 117 can present a user with content that is related to video 103B. The end cap module 109 can customize the end cap UI 117 based on the type of video 103B that has completed playback. One implementation of customizing the end cap UI based on the type of video that has finished playing is described in greater detail below in conjunction with FIG. 2. For example, the end cap module 109 may provide an end cap UI that includes a set 123 of related videos and/or a set of UI elements to receive input to perform an action (e.g., share, like, rate, comment, etc.) relating to the video for a short period of time. In another example, the end cap module 109 may provide an end cap UI 117 that includes a next video 121 episode, a next video 121 in a playlist, etc. The end cap module 109 can provide more than one end cap UI 117 in response to an online media item (e.g., video 103B) completing playback.

Figure 2:
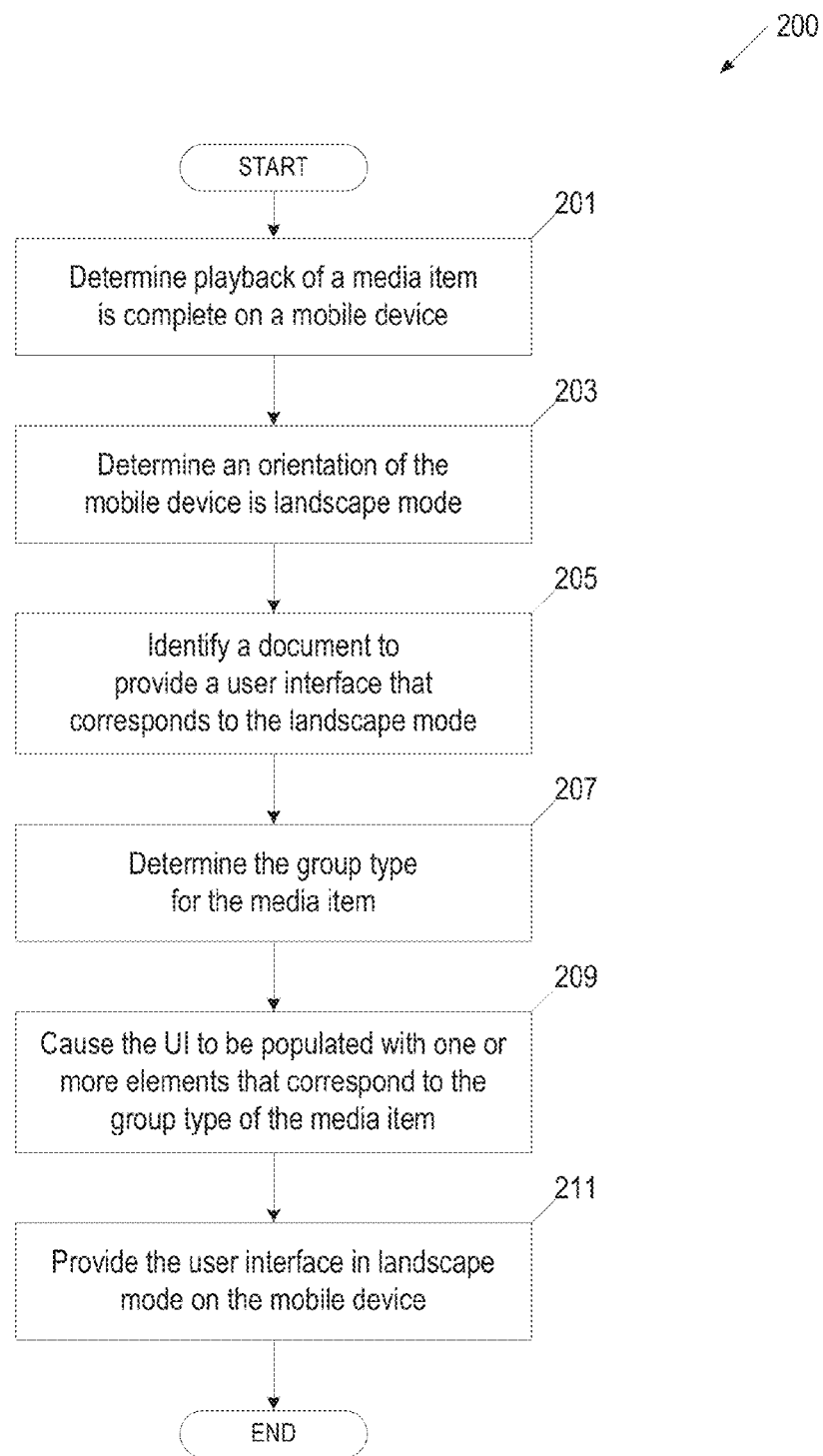
FIG. 2 is flow diagram of an implementation of a method for providing custom mobile end cap user interfaces based on mobile device orientation.

FIG. 2 is flow diagram of an implementation of a method 200 for providing custom mobile end cap user interfaces based on mobile device orientation. The method may be performed by processing logic that may comprise hardware (circuitry, dedicated logic, etc.), software (such as is run on a general purpose computer system or a dedicated machine), or a combination of both. In one implementation, the method 200 may be performed by the end cap module 109 on a mobile device 100 in FIG. 1.

At block 201, the end cap module determines that the playback of a media item (e.g., video) is complete on a mobile device. For example, the end cap module receives a notification of an event that the playback of the media item has ended. The end cap module may receive the notification, for example, from a media application, a mobile device operating system, etc. At block 203, the end cap module determines the orientation of the mobile device is in landscape mode. In one implementation, there is an application platform that queries the operating system of the mobile device in the background for the orientation of the mobile device and receives the orientation from the operating system. The application platform can store an orientation state, which indicates whether the mobile device is in portrait mode or landscape mode, in a data store. The end cap module can query the application platform for the orientation state and receive a result. In another implementation, the end cap module accesses the stored orientation state in the data store. In another implementation, the end cap module queries the operating system for the orientation of the mobile device and receives a result.

At block 205, the end cap module identifies a document (e.g., webpage or any other type of document) to be rendered (e.g., by a web browser or a mobile app (mobile application)) to provide a landscape mode user interface (e.g., end cap UI) that corresponds to the landscape mode. The end cap module can access configuration data that is stored in the data store, which is coupled to the end cap module that specifies which document can be used for a landscape mode user interface (e.g., end cap) that corresponds to the landscape mode. The landscape mode user interface may be a graphical user interface (GUI). The landscape mode user interface can be configured to be positioned in landscape orientation in a display on the mobile device. In one implementation, the end cap module obtains the document for the landscape mode user interface from the data store. In another implementation, the end cap module creates the document for the landscape mode user interface using a template in the data store.

At block 207, the end cap module determines the group type for the media item. The group type may be, for example, 'non-group' or 'group'. For example, a media item that is of the 'group' type may be part of a playlist and/or may be an episodic media item. In another example, a media item that is of the 'non-group' type may not be part of a playlist or may not be an episodic media item. An episodic media item is a media item that is an episode in a series of episodes of media items. The end cap module can access header data that is part of the media item to determine the group type for the media item.

At block 209, the end cap module causes the landscape mode user interface (e.g., end cap UI) that corresponds to the landscape mode to be populated with one or more elements that correspond to the group type for the media item. For example, the end cap module can populate the landscape mode user interface with one or more media items that are related to the media item that has completed playback, one or more user input elements for an action (e.g., like, rate, share, comment, etc.) to be performed that is related to the media item that has completed playback, a next media item in a playlist, a random media item in the playlist, a next episodic media item in a series of episodes of media items, etc. The end cap module can determine which elements to use to populate the landscape mode user interface from configuration data that is stored in the data store. One implementation of populating the landscape mode user interface with elements to correspond to the group type of the media item is described in greater detail below in conjunction with FIG. 3.

For example, if the video is part of a playlist, the end cap module may populate the landscape mode user interface (e.g., end cap UI) with the next video in the playlist. At block 211, the end cap module provides the landscape mode user interface (e.g., end cap UI), which is populated with the elements, in landscape mode on the mobile device.

The media item that has finished playback can have one or more end cap user interfaces. Portions of method 200 can be iterative. The number of iterations can be based on the number of end cap user interfaces that correspond to the media item. The number of end cap user interfaces that correspond to a media item can be specified in configuration data that is stored in the data store. For example, if the video is part of a playlist, the end cap module may populate the landscape mode user interface (e.g., end cap UI) with the related videos and user input (e.g., like, share, rate, comment, etc.) elements and after a period of time (e.g., ten seconds) may re-populate the landscape mode user interface (e.g., end cap UI) with next video in the playlist. In another example, the end cap module may provide another landscape mode user interface (e.g., end cap UI) that contains the next video in the playlist. The period of time can be specified in the configuration data.

Figure 3:
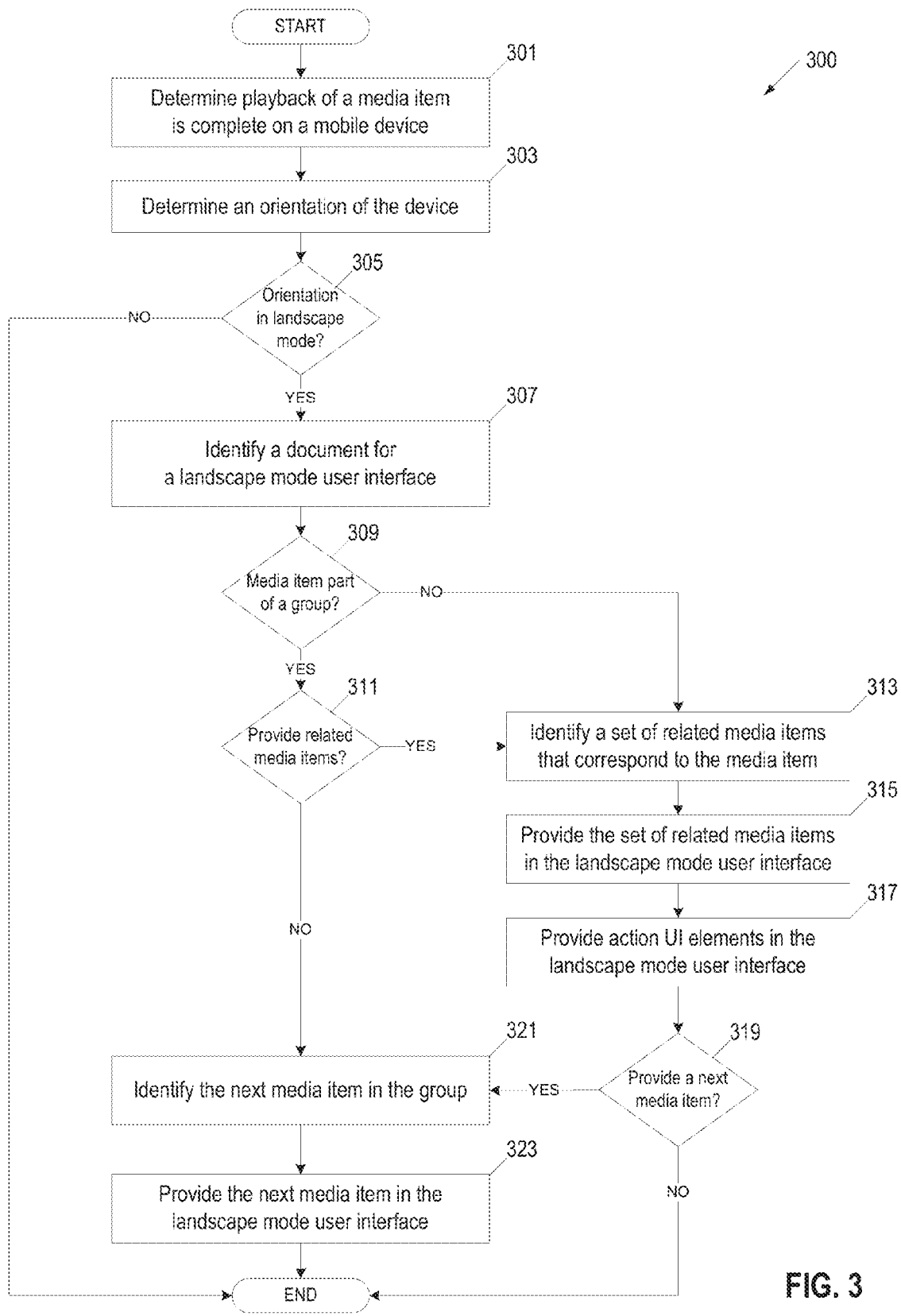
FIG. 3 is flow diagram of an implementation of a method for providing custom mobile end cap user interfaces based on mobile device orientation.

FIG. 3 is a flow diagram of an implementation of a method 300 for providing custom mobile end cap user interfaces based on mobile device orientation. The method may be performed by processing logic that may comprise hardware (circuitry, dedicated logic, etc.), software (such as is run on a general purpose computer system or a dedicated machine), or a combination of both. In one implementation, the method 300 may be performed by the end cap module 109 on a mobile device 100 in FIG. 1.

At block 301, the end cap module determines that the playback of a media item (e.g., video) on a mobile device has completed and determines the orientation of the mobile device at the time of completion at block 303. When the video has finished playing, the orientation of the mobile device may be in a portrait (e.g., vertical) mode or landscape (e.g., horizontal) mode. At block 305, the end cap module determines whether the orientation of the device is landscape mode. If the device orientation is landscape mode, the end cap module identifies a document for a landscape mode user interface (e.g., end cap UI) at block 307. At block 309, the end cap module determines whether the media item is part of a group of media items. For example, the end cap module may determine whether the media item is part of a playlist and/or is an episode in a series of episodes.

If the media item is part of a group (block 309), the end cap module determines whether to provide a set of related media items to the user via the landscape mode user interface (e.g., end cap UI) at block 311. The end cap module can access configuration data that is stored in a data store that is coupled to the end cap module to determine whether to provide the set of related media items. If the end cap module is not to provide the set of related media items (block 311), the end cap module identifies the next media item in the group at block 321, and provides the next media item in the landscape mode user interface (e.g., end cap UI) at block 323.

If the media item is not part of a group (block 309) or if the end cap module is to provide the set of related media items to the user (block 311), the end cap module identifies a set of related media items that correspond to the media item at block 313. The set of related media items can be media items that are recommended based on the media item. In one implementation, the end cap module requests a set of related media items from a system (e.g., recommendation system) and receives the set of related media items from the system. In another implementation, the end cap module accesses a data store that stores the set of related media items to obtain the set of related media items.

At block 315, the end cap module provides the set of related media items via the landscape mode user interface (e.g., end cap UI). The end cap module can populate the landscape mode user interface with the set of related media items. At block 317, the end cap module provides one or more action user interface (UI) elements in the landscape mode user interface. The action UI elements can receive user input to perform an action relating to the media item. Examples of actions can include, and are not limited to, sharing the media item, liking the media item, adding the media item to a playlist, rating the media item, commenting on the media item, etc.

At block 319, the end cap module determines whether to provide a next media item. If the media item is not part of a group of media items (e.g., playlists, episodic media items, etc.), the end cap module does not provide a next media item. If the media item is part of a group (block 319), the end cap module identifies the next media item in the group at block 321 and provides the next media item in the landscape mode user interface at block 323. The end cap module can access header information for the media item to determine the next media item in the group.

Figure 4:
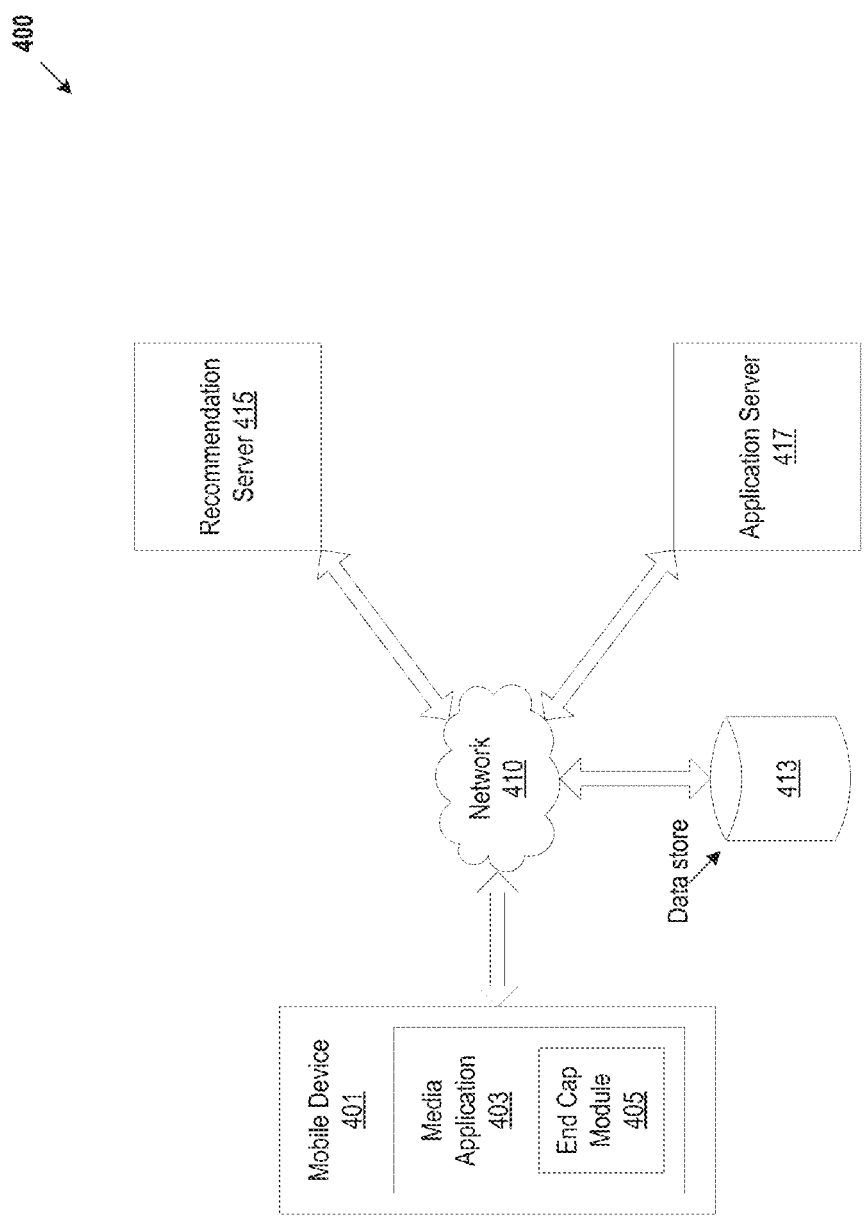
FIG. 4 illustrates exemplary system architecture in which implementations can be implemented.

FIG. 4 illustrates exemplary system architecture 400 in which implementations can be implemented. The system architecture 400 can include one or more mobile devices 401, one or more servers 415,417, and one or more data stores 413 coupled to each other over one or more networks 410. The network 410 may be public networks (e.g., the Internet), private networks (e.g., a local area network (LAN) or wide area network (WAN)), or a combination thereof.

The data stores 413 can store media items, such as, and not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. A data store 413 can be a persistent storage that is capable of storing data. As will be appreciated by those skilled in the art, in some implementations data store 413 might be a network-attached file server, while in other implementations data store 413 might be some other type of persistent storage such as an object-oriented database, a relational database, and so forth.

The mobile devices 401 can be portable computing devices such as a cellular telephones, personal digital assistants (PDAs), portable media players, netbooks, laptop computers, an electronic book reader or a tablet computer (e.g., that includes a book reader application), a set-top box, a gaming console, a television, and the like.

The mobile devices 401 can run an operating system (OS) that manages hardware and software of the mobile devices 401. A media application 403 can run on the mobile devices 401 (e.g., on the OS of the mobile devices). For example, the media application 403 may be a web browser that can access content served by an application server 417 (e.g., web server). In another example, the mobile application 403 may be an application that can access content served by an application server 417 (e.g., mobile application server).

The application server 417 can provide web applications and/or mobile device applications and data for the applications. The recommendation server 415 can provide media items (e.g., videos) that are related to other media items. The sets of related media items can be stored on one or more data stores 413. The servers 415,417 can be hosted on machines, such as, and not limited to, rackmount servers, personal computers, desktop computers, media centers, or any combination of the above.

The end cap module 405 can provide custom mobile end cap user interfaces based on mobile device orientation and the media item that has completed playback on the mobile device. For example, if a video that has completed playing via the media application 403 on the mobile device 401 in landscape mode and if the video is part of a group of videos, the end cap module 405 can provide an end cap UI that contains the next video in the group that is to be played next. For example, if the video that has completed playing is Episode-6, the end cap module 405 can provide an end cap UI that includes Episode-7. The end cap module 405 can provide an end cap UI in a landscape orientation on the mobile device 401 when a video has completed playing.

Figure 5:
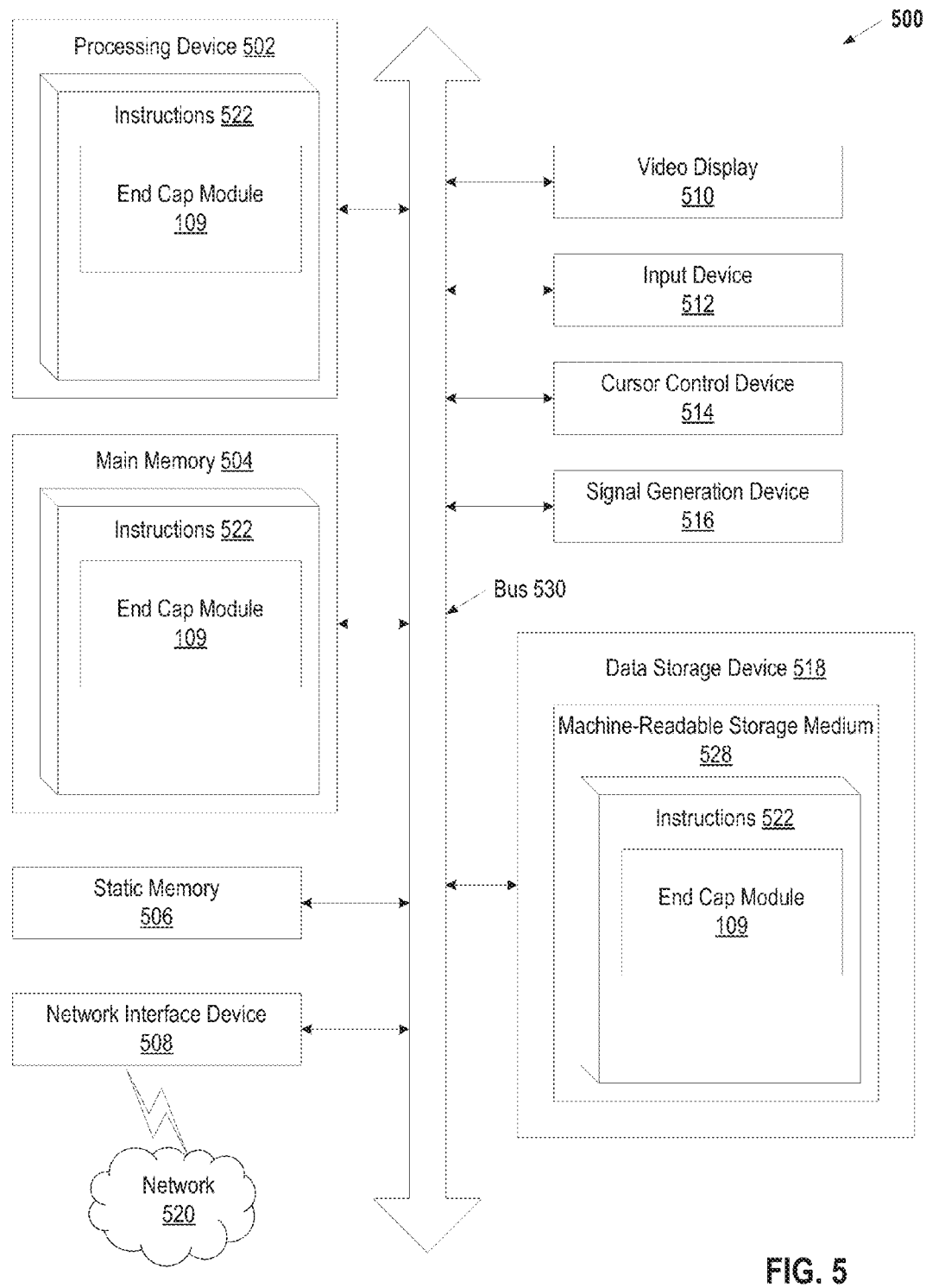
FIG. 5 is a block diagram of an example computer system that may perform one or more of the operations described herein, in accordance with various implementations.

FIG. 5 illustrates a diagram of a machine in an example form of a computer system 500 within which a set of instructions, for causing the machine to perform any one or more of the methodologies discussed herein, may be executed. The computer system 500 can be mobile device 100 in FIG. 1. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an input device 512 (e.g., a keyboard, and alphanumeric keyboard, a motion sensing input device,), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one implementation, the instructions 522 include instructions for an end cap module (e.g., end cap module 109 in FIG. 1) and/or a software library containing methods that call the end cap module. While the computer-readable storage medium 528 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "providing", "populating", "changing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   determining, by a mobile device, playback of a media item in a media player user interface is complete on the mobile device;
   determining, by the mobile device, that an orientation of the mobile device is in landscape mode at a time the playback of the media item is complete;
   in response to determining the orientation of the mobile device is in landscape mode, automatically identifying, based on configuration data, a plurality of user interfaces (UIs) that corresponds to the landscape mode, wherein individual UIs of the plurality of UIs have a graphical layout different from each other;
   determining, by the mobile device, a type of the media item, the type indicating whether the media item is part of a group of media items;
   in response to determining the type of the media item, automatically populating the individual UIs of the plurality of UIs with one or more elements that correspond to the type of the media item;
   replacing, by the mobile device, the media player user interface including the media item with one of the plurality of UIs, the one of the plurality of UIs comprising at least one element related to the media item that has completed playback; and
   upon determining a pre-defined period of time has elapsed, automatically replacing, based on the type of the media item, the one of the plurality of UIs with another one of the plurality of UIs, the another one of the plurality of UIs comprising at least one other element related to the media item that has completed playback.

2. The method of claim 1, wherein the media item is an episodic media item and the one or more elements comprise a series of episode media items.

3. The method of claim 1, wherein the media item is part of a playlist and the one or more elements comprise a set of media items in the playlist.

4. The method of claim 1, wherein the one or more elements comprise a recommended media item identified by a recommendation system based on the media item that has completed playback.

5. The method of claim 1, wherein determining the type of the media item comprises:
   determining whether the media item is part of the group based on header information of the media item that has completed playback.

6. The method of claim 1, further comprising:
   providing one or more user interface elements in the user interface to receive user input evaluating the media item that has completed playback.

7. A mobile device comprising:
   a memory; and
   a processing device coupled with the memory to:
   determine playback of a media item in a media player user interface is complete on the mobile device;
   determine that an orientation of the mobile device is in landscape mode at a time the playback of the media item is complete;
   in response to a determination that the orientation of the mobile device is in landscape mode, automatically identify, based on configuration data, a plurality of user interfaces (UIs) that corresponds to the landscape mode, wherein individual UIs of the plurality of UIs have a graphical layout different from each other;
   determine a type of the media item, the type indicating whether the media item is part of a group of media items;
   in response to a determination of the type of the media item, automatically populate the individual UIs of the plurality of UIs with one or more elements that correspond to the type of media item;
   replace the media player user interface including the media item with one of the plurality of UIs that corresponds to the landscape mode, the one of the plurality of UIs comprising at least one element related to the media item that has completed playback; and
   upon a determination that a pre-defined period of time has elapsed, automatically replace, based on the type of the media item, the one of the plurality of UIs with another one of the plurality of UIs, the another one of the plurality of UIs comprising at least one other element related to the media item that has completed playback.

8. The apparatus of claim 7, wherein the media item is an episodic media item and the one or more elements comprise a series of episode media items.

9. The apparatus of claim 7, wherein the media item is part of a playlist and the one or more elements comprise a set of media items in the playlist.

10. The apparatus of claim 7, wherein the one or more elements comprise a recommended media item identified by a recommendation system based on the media item that has completed playback.

11. The apparatus of claim 7, wherein to determine the type of the media item, the processing device is to:
    determine whether the media item is part of the group based on header information of the media item that has completed playback.

12. The apparatus of claim 7, wherein the processing device is further to:
    provide one or more user interface elements in the user interface to receive user input evaluating the media item that has completed playback.

13. A non-transitory computer readable storage medium encoding instructions thereon that, in response to execution by a processing device of a mobile device, cause the processing device to perform operations comprising:
    determining, by the mobile device, playback of a media item in a media player user interface is complete on the mobile device;
    determining, by the processing device, that an orientation of the mobile device is in landscape mode at a time the playback of the media item is complete;
    in response to determining the orientation of the mobile device is in landscape mode, automatically identifying, based on configuration data, a plurality of user interfaces (UIs) that corresponds to the landscape mode, wherein individual UIs of the plurality of UIs have a graphical layout different from each other;
    determining, by the mobile device, a type of the media item, the type indicating whether the media item is part of a group of media items;
    in response to determining the type of the media item, automatically populating the individual UIs of the plurality of UIs with one or more elements that correspond to the type of media item;

replacing, by the mobile device, the media player user interface including the media item with one of the plurality of UIs, the one of the plurality of UIs comprising at least one element related to the media item that has completed playback; and upon determining a pre-defined period of time has elapsed, automatically replacing, based on the type of the media item, the one of the plurality of UIs with another one of the plurality of UIs, the another one of the plurality of UIs comprising at least one other element related to the media item that has completed playback.

14. The non-transitory computer readable storage medium of claim 13, wherein the media item is an episodic media item and the one or more elements comprise a series of episode media items.

15. The non-transitory computer readable storage medium of claim 13, wherein the media item is part of a playlist and the one or more elements comprise a set of media items in the playlist.

16. The non-transitory computer readable storage medium of claim 13, wherein the at least of the one or more elements is recommended by a recommendation system based on the media item that has completed playback.

17. The non-transitory computer readable storage medium of claim 13, the operations further comprising:

providing one or more user interface elements in the user interface to receive user input evaluating the media item that has completed playback.

\* \* \* \* \*